United States Patent [19]
Botto et al.

[11] Patent Number: 5,821,112
[45] Date of Patent: Oct. 13, 1998

[54] BIOLOGICAL ODOR METABOLIZING COMPOSITIONS AND METHODS OF USE

[76] Inventors: Willsm S. Botto, 10951 Lauerate #2010, San Antonio, Tex. 78249;
Richard L. Geisler, 3211 Litchfield, San Antonio, Tex. 78230

[21] Appl. No.: 726,381

[22] Filed: Oct. 4, 1996

[51] Int. Cl.$^6$ ..................................................... B09B 3/00
[52] U.S. Cl. .............................. 435/262; 435/41; 435/42; 435/128; 435/262.5; 435/267; 435/268
[58] Field of Search ................................. 435/69.1, 69.3, 435/41, 42, 128, 262, 262.5, 267, 268, 800, 821

[56] References Cited

U.S. PATENT DOCUMENTS

| | | | |
|---|---|---|---|
| 4,253,703 | 3/1981 | Fonseca et al. | 299/5 |
| 4,317,670 | 3/1982 | Khoroshavin et al. | 71/6 |
| 4,350,770 | 9/1982 | Spraker | 435/253 |
| 4,537,682 | 8/1985 | Wong-Chong | 210/611 |
| 4,605,502 | 8/1986 | Hata | 210/611 |
| 4,673,505 | 6/1987 | Wong | 210/611 |
| 4,720,344 | 1/1988 | Ganczarczyk et al. | 210/612 |
| 5,154,594 | 10/1992 | Gamlen | 119/171 |
| 5,242,825 | 9/1993 | Mueller et al. | 435/253.3 |

FOREIGN PATENT DOCUMENTS

| | | |
|---|---|---|
| 63-236361 | 6/1990 | Japan . |
| 63-257269 | 7/1990 | Japan . |
| 01-50019 | 11/1990 | Japan . |

*Primary Examiner*—Ardin H. Marschel
*Attorney, Agent, or Firm*—Jayme A. Huleatt

[57] ABSTRACT

Mixed bacterial compositions minimally contain a mixed population of bacteria including at least one species of Nitrosomonas capable of converting ammonia to nitrite, at least one species of Nitrobacter capable of converting nitrite to nitrate, at least one species of Pseudomonas capable of converting nitrate to nitrite and capable of metabolizing urea, and at least one species of Enterobacter capable of metabolizing bacterial waste products and fermenting lactose. The ability of these aforementioned bacteria to metabolize the odor; and partially decompose the waste material producing the odor is enhanced by the addition of an acclimated mixed bacterial culture to the mixed bacterial composition containing the aforementioned species of Nitrosomonas, Nitrobacter, Pseudomonas, and Enterobacter. The acclimated mixed bacterial culture includes at least one and up to four different species or strains of Pseudomonas, at least one species of Acinetobacter, and at least one species of Enterobacter. The mixed bacterial compositions of the present invention can optionally contain at least one species of Bacillus. These mixed bacterial compositions can be applied to human and animal organic waste to reduce the odor and partially degrade the waste.

18 Claims, No Drawings

BIOLOGICAL ODOR METABOLIZING COMPOSITIONS AND METHODS OF USE

BACKGROUND OF INVENTION

1. Field of Invention

The present invention relates generally to the field of treatment of biological wastes. More particularly, the present invention relates to a liquid mixed bacterial composition and the use of the liquid mixed bacterial composition in metabolizing odor produced by human and animal waste products, such as urine and feces; and in the partial decomposition of these waste products.

2. Background Information

The disposal of human and animal wastes is continuing to be a major environmental problem as the population of both humans and animals increases. These wastes must be treated and disposed of in a safe and hygienic manner to prevent the spread of disease as well as to reduce or eliminate the odor associated with these wastes. Safe, efficient, and environmentally friendly disposal of these wastes will have a positive impact on the environment.

Treatment with bacteria-containing compositions is well known in the field of wastewater treatment, grease-trap treatment, and environmental hydrocarbon contamination. These bacteria-containing compositions generally contain a mixture of microorganisms that act in concert to metabolize the waste to harmless end products. There are numerous examples of bacterial treatment of wastewater, industrial refuse heaps, and activated sludge; and the removal of subterranean coal, where the primary objective is to convert ammonia to free nitrogen. In treating wastewater containing ammonia, it is known that certain aerobic heterotrophic microorganisms can oxidize ammonia to nitrite and that nitrite can be further microbially oxidized to nitrate. This sequence of reactions is known as nitrification, which is performed by microorganisms belonging to the genera Nitrosomonas and Nitrobacter. Nitrosomonas can oxidize ammonia to nitrite in an aqueous system in which dissolved oxygen levels are in excess of approximately 0.5 mg/l and free ammonia is below about 10–150 mg/l. Nitrobacter are known to oxidize nitrite to nitrate in an aqueous system where the dissolved oxygen is above 0.5 mg/l, free ammonia is below 0.1–10 mg/l, and free nitrous acid is below 0.2–2.8 ml/l. The growth rates and the nitrite reaction rates of both of these bacteria are dependent upon the solution temperature, pH, and dissolved oxygen levels.

Complete elimination of ammonia by oxidation to nitrite and/or nitrate followed by reduction of nitrite and/or nitrate to nitrogen gas is known as denitrification, and is mediated by facultative heterotrophic microorganisms from genera, such as Pseudomonas, Achromobacter, Bacillus, and Micrococcus. The growth rates and denitrification reaction rates are a function of solution temperature, pH, and the ratio of dissolved oxygen to nitrite/nitrate oxygen availability.

Even though the biologically mediated processes of nitrification and denitrification, and conversion of ammonia to free nitrogen using Nitrosomonas, Nitrobacter, and facultative heterotrophic microorganims are well known. Improvements in conventional methods of treating wastewater containing high levels of ammonia and other contaminants are still needed. The research and development to upgrade the performance of biological treatment systems to handle high ammonia containing liquids has been basically considered unsuccessful to date.

U.S. Pat. No. 4,537,682 discloses a detailed activated sludge process for treating wastewater using a mixed population of microorganisms, which were acclimated to the ammonia and other contaminants in the wastewater and were capable of converting ammonia to nitrite, capable of converting nitrite to nitrate, and capable of oxidizing organic material and converting nitrite and/or nitrate to free nitrogen. The steps of this activated sludge process are performed under very specific controlled conditions.

U.S. Pat. No. 4,720,344 discloses a nitrification process for wastewater treatment to reduce or eliminate the nitrite to nitrate oxidation step in ammonia containing wastewater under aerobic conditions that are favorable to Nitrosomonas and unfavorable to Nitrobacter. This process is directed to eliminating or reducing the redundant step that produces nitrate from nitrite by Nitrobacter, which must subsequently be returned to nitrite before it is converted to nitrogen. The elimination of this step reduces costs and energy use.

U.S. Pat. No. 4,673,505 discloses a wastewater treatment aqueous bacterial composition and an inhibiting amount of an inorganic azide composition, which is sufficient to maintain the bacteria dormant until reactivation. When reactivated, the bacteria including Pseudomonas, Nitrosomonas, and Nitrobacter are capable of degrading organic materials. The purpose of the inhibitor is to confer a useful shelf life as well as providing a faster reactivation time than similar sulfide inhibited systems.

Japanese Application No. 01-50019 discloses a crude refuse treating liquid containing a mixed population of bacteria, medium, carrier, ammonium chloride, saccharides, perfumes, surfactant and water. This bacteria containing liquid is incubated under extremely high oxygen concentrations in an air layer installed in the lower part of a vessel cap and filter. The vigorous growth and propagation of the bacteria containing liquid and the refuse results in the decomposition of the malodorous components. Japanese Patent Application No. 63-236361 discloses using a mixed bacterial component, medium, carrier, colorant, refreshing drink, and the product of lactic fermentation to treat filthy water and generate a fragrance.

The above cited patents disclose using mixed populations of bacteria in aqueous environments to reduce the contaminants, particularly ammonia, in wastewater. It is also known in the bioremediation field to treat contaminated soils with populations of bacteria as disclosed in U.S. Pat. Nos. 5,242,825 and 4,317,670.

It is known to make animal litter by mixing absorptive material with non-enteric bacteria; specifically Bacillus, for decomposing animal waste; and optionally a fragrance as disclosed in U.S. Pat. No. 5,154,594. A form of bacteria useful with the absorptive material is sold as a dry powder under the name "BIO-ENZYMES " and contains various strains of bacillus bacteria; wheat bran; bacillus enzymes; i.e., protease, amylase, and other enzymes; pancreatin; and other components, such as, dextrose, monopotassium phosphate, and magnesium sulfate. The animal litter is made by mixing 10 pounds of the absorptive material with 2 tablespoons of bacteria in a solid form. Optionally cedar needles or cedar oil can be added to serve as a fragrance, which is added to control odor until the bacteria decompose the animal waste. The animal litter produced by this method is a dry litter that absorbs liquids. U.S. Pat. No. 5,154,594 discloses the animal litter with the dried bacteria already mixed with the absorptive material; and it is expected that this type of litter would be more expensive when compared to the generic animal litter with no additives.

An advantage of the mixed bacterial composition of the present invention is that it is available in liquid form so that it can be sprayed on the most inexpensive animal litter. Further, the amount of mixed bacterial composition that is sprayed on the animal litter can be controlled by the user to meet specific needs dependent upon how much the animal litter is used. For example, in a household with more than one cat, it would be expected that the litter would need to be changed more often. The mixed bacterial composition of the present invention allows the pet owner to buy inexpensive generic litter and spray the composition on the litter to provide the amount necessary to reduce the odor and partially decompose the waste. Further, the liquid form of the mixed bacterial composition allows the user to use the composition for other purposes, such as cleaning areas of carpets, fabric, and upholstery soiled with organic waste material.

The liquid mixed bacterial composition can be initially applied but as time goes on and the environmental conditions in the waste material eventually deteriorate additional applications can be made to the same litter. These additional applications introduce fresh bacteria into the waste thus continuing treatment of both old and new waste material in the litter. Eventually the animal litter can be completely replaced with fresh litter but the liquid mixed bacterial composition of the present invention extends the longevity of the litter; and therefore, reduces the amount of animal litter that must be purchased. The mixed bacterial composition of the present invention provides a unique combination of bacteria that maintains the diversity necessary to effect odor reduction and partial decomposition of the waste over time.

The present invention is directed to a liquid mixed bacterial composition for use in treating animal or human wastes in private homes, barns, hospitals, locker rooms, nursing homes, and any other environment where such wastes are present. The composition of the present invention can function to reduce the odor and partially decompose the waste in a dry or damp environment, such as in animal litter, on carpets, floors, upholstery, and any fabric, and in soil, as well as being able to function in the more standard liquid environment. The damp and dry environments are more hostile for the growth of bacteria than a liquid environment, which allows greater accessibility of the bacteria to the substrates in the animal or human wastes. Further, the liquid mixed bacterial composition could be applied to animal litter, packaged to maintain at least a damp environment prior to use, and sold as a litter containing the mixed bacterial composition of the present invention.

The liquid mixed bacterial composition of the present invention is a mixture of complementary bacteria that work synergistically to metabolize the odor produced by urine and feces; i.e., the organic acids that cause the odor, particularly in animal waste. The liquid mixed bacterial composition is also capable of partially decomposing the outer surface of the solid fecal waste, and thus forming a thin film of microbes through which the odor passes rendering the released gases odorless. The liquid composition can be used to treat and clean any human or animal waste material on any surface; and to eliminate the odor produced by these waste materials. Thus, the flexibility that the liquid mixed bacterial composition provides makes the product convenient, versatile and economical to use.

SUMMARY OF THE INVENTION

The present invention provides a versatile, unique, synergistic, liquid mixed bacterial composition for use in eliminating the odor produced by human or animal waste materials, and for use in partially decomposing these wastes.

The present invention additionally provides a liquid mixed bacterial composition that contains a mixture of at least four different species of bacteria that are collectively capable of converting ammonia to free nitrogen in animal or human waste materials.

The present invention further provides a liquid mixed bacterial composition that contains at least four different species of bacteria that are collectively capable of converting ammonia to free nitrogen, and that additionally contains an acclimated mixed bacterial culture containing additional bacteria that function to enhance the odor reducing and metabolic breakdown of the organic waste materials of the four different species of bacteria.

The present invention additionally provides a method of treating human and animal organic waste materials with the mixed bacterial compositions of the present invention.

The present invention further provides an animal litter containing the mixed bacterial compositions of the present invention.

The mixed bacterial composition of the present invention minimally contains a mixed population of bacteria including at least one species of Nitrosomonas capable of converting ammonia to nitrite, at least one species of Nitrobacter capable of converting nitrite to nitrate, at least one species of Pseudomonas capable of converting nitrate to nitrite and capable of metabolizing urea, and at least one species of Enterobacter capable of metabolizing bacterial waste products and fermenting lactose. The present inventors have determined that the pH of the environment in which the bacteria are utilized is essential to the survival of all of the bacteria. During the bacterial metabolic processing of the waste material, the nitrate accumulation on the organic waste material combines with water to from a weak nitric acid which causes the pH of the entire environment to be reduced into the acidic range. Therefore, it is essential to have at least one species of Pseudomonas present to convert the nitrate back to nitrite. This back and forth conversion of nitrite to nitrate and nitrate to nitrite not only acts as a buffering mechanism, but also reduces and eventually eliminates these two metabolites as a result of the back and forth conversions.

The aforementioned mixed bacterial composition begins to reduce the odor produced by the waste; and partially decomposes the waste; however, the reduction and elimination of odor is greatly enhanced by the addition of an acclimated mixed bacterial culture to the mixed bacterial composition containing the aforementioned species of Nitrosomonas, Nitrobacter, Pseudomonas, Enterobacter, and optionally Bacillus. The acclimated mixed bacterial culture includes at least one and up to four different species or strains of Pseudomonas, at least one species of Acinetobacter, and at least one species of Enterobacter. Some of the bacteria in the acclimated mixed bacterial culture are also capable of metabolizing urea, for example by producing urease, which initiates the process whereby urea is converted to ammonia. In addition, these bacteria are capable of metabolizing butyric acid which also gives rise to the foul odor particularly associated with human or animal organic waste, and are also capable of enzymatically metabolizing fats, oils, and greases. The mixed bacterial composition metabolizes the ammonia to free nitrogen, and when the waste is eliminated or reduced to such low levels, then the bacteria die. However, if further treatment of the waste materials is required, new bacteria can be introduced into the waste materials. Thus, the present invention provides a versatile liquid, mixed bacterial composition that provides a biological solution to the odor problem associated with organic human and animal waste materials in a variety of environments.

DETAILED DESCRIPTION OF THE PREFERRED EMBODIMENT

The mixed bacterial composition of the present invention minimally contains at least one species of Nitrosomonas capable of converting ammonia to nitrite; at least one species of Nitrobacter capable of converting nitrite to nitrate; at least one species of Pseudomonas capable of converting nitrate to nitrite and capable of metabolizing urea; and at least one species of Enterobacter capable of metabolizing bacterial waste products. More specifically, the mixed bacterial composition contains at least two species of Nitrobacter. The mixed bacterial composition also optionally contains at least one species of Bacillus. Any species of the above recited genera can be used in the present liquid mixed bacterial composition as long as the species is capable of carrying out the stated chemical conversion.

The preferred liquid mixed bacterial composition minimally contains the following bacteria:

*Nitrosomonas europaea* capable of converting ammonia to nitrite. This gram negative rod optimally grows at 30° C. in a pH range of 6.5–8.5. The appearance of the culture is smooth with regular margins, and is off-white to translucent in color when grown on Tryptic Soy Agar (TSA) with 5% sheep's blood. The culture does not show the appearance of budding pear shaped cells when, for example grown on TSA. The preferred strain of *Nitrosomonas europaea* was isolated from sea water and is identified as *Nitrosomonas europaea* Marine strain.

Two strains of Nitrobacter, *Nitrobacter agilis* and *Nitrobacter winogradskyi*, both of which are capable of converting nitrite to nitrate. These gram negative rods optimally grow at 35° C. in a pH range of 6.5–8.5. The appearance of the cultures are smooth with regular margins, and are off-white to translucent in color when grown on Tryptic Soy Agar (TSA) with 5% sheep's blood. The cultures do show the appearance of budding pear shaped cells when, for example grown on TSA. The preferred strains of *Nitrobacter agilis* and *Nitrobacter winogradskyi* were isolated from sea water and are identified as *Nitrobacter agilis* Marine strain and *Nitrobacter winogradskyi* Marine strain.

*Pseudomonas aeruginosa* strain Esmerelda was isolated from a waste water lagoon at an oil refinery in Esmerelda, Ecuador. The culture has a black pigment and is translucent with irregular margins when grown on Tryptic Soy Agar (TSA) with 5% sheep's blood. This strain is capable of converting nitrate to nitrate and of metabolizing urea, as a result of producing urease. The purified culture, *Pseudomonas aeruginosa* Esmerelda strain, was evaluated on the basis of microscopic, morphological and biochemical tests. The results of the testing are presented below in Table 1:

TABLE 1

| | |
|---|---|
| Gram Stain | Negative |
| Motile | Positive |
| Colony Morphology | Spready |
| Growth at: | |
| 25° C. | Positive |
| 35° C. | Positive |
| 42° C. | Positive |
| Centrimide | Positive (Green) |

TABLE 1-continued

| | |
|---|---|
| Salmonella/Shigella | Positive |
| Oxidase | Positive |
| Catalase | Positive |
| MacConkey | Positive |
| Citrate | Positive |
| 6.5% NaCl | Negative |
| Urea | Positive |
| Triple Sugar Iron | K/K |
| Nitrate | Positive - Gas |
| Indole | Negative |
| Esculin | Negative |
| Gelatin | Positive |
| Litmus Milk | Positive (Peptonization) |
| Utilization of: | |
| Lysine | Negative |
| Arginine | Positive |
| Ornithine | Negative |
| Carbohydrate Base Media: | Fermentative  Oxidative |
| Glucose | Negative  Positive |
| Xylose | N.D.  Positive |
| Mannitol | N.D.  Weak Positive |
| Lactose | N.D.  Negative |
| Sucrose | N.D.  Positive |
| Maltose | N.D.  Positive |

N.D. = Not Done

The method of utilization of carbohydrates for *Pseudomonas aeruginosa* Esmerelda strain is oxidative. The medium used for determination of oxidative or fermentative metabolism of carbohydrates was OF medium. This medium is available from several commercial sources, such as Difco Laboratories as Bacto OF Basal Medium or from Carr-Scarborough Microbiologicals, Inc. as OF Medium, King. Andrades Broth was also used to determine whether the bacteria metabolize carbohydrates fermentatively. The basic ingredients of Andrades Broth per liter of demineralized water is: pancreatic digest of casein—10.0 g, beef extract—2.0 g, sodium chloride—5.0 g, Andrades Indicator (pH 7.4±0.2@25° C.)—10.0 ml. Andrades Broth is available either as the base control containing no carbohydrate or with 1.0% carbohydrate. This media can be obtained from Carr-Scarborough Microbiologicals, Inc., Stone Mountain, Ga. 30086.

The *Enterobacter cloacae* used in the present composition was isolated from soil near a feed lot in South Texas, and is designated as *Enterobacter cloacae* South Texas strain. This bacteria is a gram negative rod, is a lactose fermented, and is capable of metabolizing the metabolic waste; i.e., fatty acids, of the other bacteria present in the composition. The culture has regular margins, and is white to opaque in color when grown on Tryptic Soy Agar (TSA) with 5% sheep's blood.

Optionally, the mixed bacterial composition containing the at least four species of bacteria, Nitrobacter, Nitrosomonas, Pseudomonas, and Enterobacter can also contain a species of Bacillus. The preferred Bacillus species, *Bacillus thuringensis*, Wastewater strain, was isolated from wastewater at a food processing facility. The culture is white to off-white with botriodial shaped colonies and a milky to mucoid appearance.

The aforementioned combination of Nitrobacter, Nitrosomonas, Pseudomonas, Enterobacter, and optionally Bacillus together are capable of metabolizing the organic waste generated odor; and of partially metabolizing the organic waste; however, the reduction and elimination of the odor is greatly enhanced by an additional complement of bacteria which are first acclimated on minimal media to produce an acclimated mixed bacterial culture. This acclimated mixed bacterial culture is then mixed with the aforementioned at least four species of bacteria to produce a preferred mixed bacterial composition of the present invention. The acclimated mixed bacterial culture contains the following bacteria:

*Pseudomonas aeruginosa* Original strain was isolated from an oil/water evaporation pond in South Texas. This bacteria is a gram negative rod and metabolizes hydrocarbons, particularly paraffin, under aerobic conditions. The cultures are translucent with irregular margins when grown on TSA with 5% sheep's blood media.

*Pseudomonas aeruginosa* Odessa strain was isolated from hydrocarbon contaminated soil in Odessa, Tex. This bacteria also is a gram negative rod and metabolizes hydrocarbons, preferably chlorinated hydrocarbons, under aerobic conditions. The cultures are translucent with irregular margins and have a black pigment when grown on TSA with 5% sheep's blood media.

*Pseudomonas putida mendocina* Tethys strain was isolated from contaminated groundwater in Pennsylvania. The purified culture has a mucoid, translucent, white, slightly opaque appearance with slightly irregular margins when grown on TSA with 5% sheep's blood media. This bacteria was evaluated on the basis of microscopic, morphological and biochemical tests. The results of the testing are presented below in Table 2:

TABLE 2

| TEST/OBSERVATION DESCRIPTION | RESULT DESCRIPTION |
|---|---|
| Gram Stain | Negative |
| Motile | Positive |
| Growth at: | |
| 25° C. | Positive |
| 35° C. | Positive |
| 42° C. | Positive |
| Colony Morpholooy | Slightly Spready |
| Centrimide | Positive |
| Salmonella/Shigella | Positive |
| Oxidase | Positive |
| Catalase | Positive |
| MacConkey | Positive |
| Citrate | Positive |
| 6.5% NaCl | Negative |
| Urea | Negative |
| Triple Sugar Iron | K/K |
| Nitrate | Positive |
| Indole | Negative |
| Esculin | Negative |
| Gelatin | Negative |
| Litmus Milk | Negative |
| Utilization of: | |
| Lysine | Negative |
| Arginine | Positive |
| Ornithine | Negative |

| Carbohydrate Base Media: | Fermentative | Oxidative |
|---|---|---|
| Glucose | Negative | Weak Positive |
| Xylose | N.D. | Weak Positive |
| Mannitol | N.D. | Negative |
| Lactose | N.D. | Negative |
| Sucrose | N.D. | Negative |
| Maltose | N.D. | Negative |

N. D. = Not Done

*Pseudomonas fluorescens* Pleasanton strain was isolated from petroleum contaminated soil. The purified culture is mucoid, translucent, smooth with regular margins with a white to slightly yellow pigment when grown on TSA with 5% sheep's blood media. This bacteria was evaluated on the basis of microscopic, morphological and biochemical tests. The results of the testing are presented below in the Table 3:

TABLE 3

| TEST/OBSERVATION DESCRIPTION | RESULT DESCRIPTION |
|---|---|
| Gram Stain | Negative |
| Motile | Positive |
| Growth at: | |
| 25° C. | Positive |
| 35° C. | Positive |
| 42° C. | Negative |
| Colony Morphology | Medium Spready |
| Centrimide | Weak Positive |
| Salmonella/Shigella | Positive |
| Oxidase | Positive |
| Catalase | Positive |
| MacConkey | Positive |
| Citrate | Positive |
| 6.5% NaCl | Negative |
| Urea | Positive |
| Triple Sugar Iron | K/K |
| Nitrate | Negative |
| Indole | Negative |
| Esculin | Negative |
| Gelatin | Positive |
| Litmus Milk | Positive (Peptonization) |
| Utilization of: | |
| Lysine | Negative |
| Arginine | Positive |
| Ornithine | Negative |

| Carbohydrate Base Media: | Fermentative | Oxidative |
|---|---|---|
| Glucose | Negative | Positive |
| Xylose | N.D. | Positive |
| Mannitol | N.D. | Weak Positive |
| Lactose | N.D. | Weak Positive |
| Sucrose | N.D. | Negative |
| Maltose | N.D. | Negative |

N.D. = Not Done

*Acinetobacter calcoaceticus biolwoffii* E. Texas strain was isolated from produced oil/water from a working oil well in East Texas. The purified culture is smooth, opaque, off white to yellow and regular margins when grown on TSA with 5% sheep's blood media. This bacteria was evaluated on the basis of microscopic, morphological and biochemical tests. The results of the testing are presented below in the Table 4:

TABLE 4

| TEST/OBSERVATION DESCRIPTION | RESULT DESCRIPTION |
|---|---|
| Gram Stain | Negative |
| Motile | Negative |
| Growth at: | |
| 25° C. | Positive |
| 35° C. | Positive |
| 42° C. | Positive |
| Colony Morphology | Smooth Round |
| Centrimide | Positive |
| Salmonella/Shigella | Positive |
| Oxidase | Negative |
| Catalase | Positive |
| MacConkey | Positive |
| Citrate | Positive |
| 6.5% NaCl | Weak Positive |
| Urea | Negative |
| Triple Sugar Iron | K/K |
| Nitrate | Positive |

TABLE 4-continued

| TEST/OBSERVATION DESCRIPTION | RESULT DESCRIPTION | |
|---|---|---|
| Indole | Negative | |
| Esculin | Negative | |
| Gelatin | Negative | |
| Litmus Milk | Positive (Peptonization) | |
| Utilization of: | | |
| Lysine | Negative | |
| Arginine | Weak Positive | |
| Ornithine | Negative | |

| Carbohydrate Base Media: | Fermentative | Oxidative |
|---|---|---|
| Glucose | Negative | Positive |
| Xylose | Negative | Positive |
| Mannitol | Negative | Negative |
| Lactose | Negative | Weak Positive |
| Sucrose | Negative | Negative |
| Maltose | Negative | Weak Positive |

The acclimated mixed bacterial culture also contains a species of Enterobacter, preferably *Enterobacter cloacae,* South Texas strain, that is also used in the mixed bacterial composition when at least four species of bacteria are minimally included. Any species of Enterobacter can be used that preferably is a lactose fermenter so that this bacteria can metabolize the waste products of the other bacteria present in the bioreactor during the process of producing the acclimated mixed bacterial culture. Preferably the same species of Enterobacter is used in the acclimated mixed bacterial culture as is used in the mixed bacterial composition.

One embodiment of the mixed bacterial culture of present invention is produced by culturing separately each of *Nitrosomonas europeae* Marine strain, *Nitrobacter agilis* Marine strain, *Nitrobacter winogradskyi* Marine strain, *Pseudomonas aeruginosa* Esmerelda strain, *Enterobacter cloacae* South Texas strain, and optionally *Bacillus thuringensis,* Wastewater strain, in Tryptic Soy Broth under aerobic conditions to a cell density of greater than $1 \times 10^7$ cells/ml. The TSA broth tubes are incubated at 37° C. for 48 hours. Ten mls. of each culture are added to one gallon of dechlorinated sterile water to produce the minimum mixed bacterial composition of the present invention.

The preferred mixed bacterial composition of the present invention is produced by preparing an acclimated mixed bacterial culture by first inoculating *Pseudomonas putida mendocina* Tethys strain, *Pseudomonas fluorescens* Pleasanton strain, *Acinetobacter calcoaceticus biolwoffii* East Texas strain, and *Enterobacter cloacae* South Texas strain into a bioreactor containing media with minimal inorganic nutrients as follows: 30% ammonium nitrate (34% pure), 45% monoammonium phosphate (100%), and 25% potassium chloride (100%) in water. Thirty minutes after the initial inoculation, *Pseudomonas aeruginosa* Original strain and *Pseudomonas aeruginosa* Odessa strain are added to the bioreactor. The bioreactor is maintained at 95° F. for 2 days while stirring and culturing under aerobic conditions. The acclimated mixed bacterial mixture reaches greater than a cell density of $1 \times 10^7$ cell/ml. Each of *Nitrosomonas europeae* Marine strain, *Nitrobacter agilis* Marine strain, *Nitrobacter winogradskyi* Marine strain, *Pseudomonas aeruginosa* Esmerelda strain, *Enterobacter cloacae* South Texas strain, and *Bacillus thuringensis,* Wastewater strain were grown separately in Tryptic Soy Broth as described above.

After the cultivation of the bacteria in the bioreactor and in the separate cultures were completed, 10 mls. of each of *Nitrosomonas europeae* Marine strain, *Nitrobacter agilis* Marine strain, *Nitrobacter winogradskyi* Marine strain, *Pseudomonas aeruginosa* Esmerelda strain, *Enterobacter cloacae* South Texas strain, and *Bacillus thuringinesis* Wastewater strain were added to one gallon of the acclimated mixed bacterial mixture to produce the preferred liquid mixed bacterial composition of the present invention.

Applicant provides assurance of the permanent availability of the preferred mixed bacterial composition containing *Nitrosomonas europeae* Marine strain, *Nitrobacter agilis* Marine strain, *Nitrobacter winogradskyi* Marine strain, *Pseudomonas aeruginosa* Esmerelda strain, *Enterobacter cloacae* South Texas strain, and *Bacillus thuringensis* Wastewater strain and the acclimated mixed bacterial culture of *Pseudomonas aeruginosa* Original strain, *Pseudomonas aeruginosa* Odessa strain, *Pseudomonas putida mendocina* Tethys strain, *Pseudomonas fluorescens* Pleasanton strain, *Acinetobacter calcoaceticus biolwoffii* East Texas strain, and *Enterobacter cloacae* South Texas strain by depositing this mixed culture of bacteria designated as "Green Envy", under the terms of the Budapest Treaty on Sept. 18, 1996, at the American Type Tissue Culture Collection (ATTC), 12301 Parklawn Drive, Rockville, Md. 20852, which affords permanence of the deposit. The accession number, ATTC 55823, was assigned to the deposited mixed bacterial composition containing eleven bacteria as described herein. Applicant states that this mixed bacterial composition which is deposited is the mixed culture of bacteria which is specifically identified in this application as filed. Applicant further provides that during the pendency of the patent application access to the deposited microorganism will be allowed to those persons properly designated by the Commissioner of Patents and Trademarks; that the deposited microorganism will be replaced should it die or be destroyed during the enforceable life of any patent issued out of this patent application, for five years after the last request for a sample of the deposited microorganism or for thirty years, whichever is longer; that upon issuance of a patent, applicant will irrevocably remove all restrictions to access to the microorganism for the duration of the deposit; and that maintenance charges for the duration of the deposit will be paid.

The mixed bacterial compositions of the present invention are prepared as a liquid as described above. The liquid mixed bacterial compositions have a shelf life of up to at least 9 months. If the mixed bacterial composition contains only at least four species of Nitrosomonas, Nitrobacter, Pseudomonas, and Enterobacter, then these bacteria in Tryptic Soy Broth are diluted into to dechlorinated sterile water. If the species of Bacillus is optionally added, then it is then added as are the above bacteria. If the mixed bacterial composition contains the acclimated mixed bacterial culture containing the bacteria as described above, the at least four species of Nitrosomonas, Nitrobacter, Pseudomonas, and Enterobacter, and Bacillus in Tryptic Soy Broth are diluted into the bacteria containing media after cultivation of the acclimated mixed bacterial culture, which probably consists of water with traces of inorganic salts, such as KCl. Stabilizing agents that are well known to persons skilled in the art may be added to the mixed bacterial compositions if increased shelf life is required.

These liquid mixed bacterial compositions of the present invention can be used by applying the liquid to any surface containing human or animal organic waste materials. The liquid can be poured directly on the waste material or preferably sprayed on the waste material. The bacteria contained in the mixed bacterial compositions can function to metabolize odor and waste materials present in a liquid, damp, or dry environment. The liquid environment provides greater accessibility of the bacteria to the waste materials; however, the bacteria can also metabolize the waste in a damp or dry environment, which is more hostile to the bacteria. Eventually when the environment dries completely the Nitrosomonas in the mixed bacterial composition will not survive; and a new application of the composition must be applied. Therefore, the liquid mixed bacterial composition of the present invention is ideal for application to waste materials on dry or damp surfaces, such as animal litter, carpet, upholstery, fabrics, and floor. The liquid mixed bacterial composition of the present invention can be used to treat these surfaces by application one or more times until the odor and waste is reduced or removed.

Three different carpet sites containing cat urine were marked and treated with the mixed bacterial composition of the present invention. Site #1 contained fresh wet cat urine previously untreated with any cleaning compositions. Site #2 contained a dry, untreated spot with a strong odor of cat urine and obvious yellow stain. Site #3 contained a dry stain older than Site #2 with a strong odor of cat urine. Site #3 had been previously treated with a commercially available home carpet and upholstery cleaner. Each of the three sites were treated with the preferred mixed bacterial composition, Green Envy™ containing Nitrosomonas, Nitrobacter, Pseudomonas, Enterobacter, and Bacillus; and the acclimated mixed bacterial culture as follows: Site #1 was first blotted as dry as possible and then sprayed with Green Envy™ and left for 24 hours. Sites #2 and #3 were already dry and so they were sprayed with Green Envy™ and also left for 24 hours. The results were as follows: Site #1—no odor and no stain remained. Site #2—no odor remained but the stain remained. This site was sprayed a second time, and left for 24 hours but the stain remained. Site #3—the odor remained after the first application but after it was sprayed a second time, and left for 24 hours, no odor remained but the stain remained.

If the carpet or fabric is still wet after the successful treatment (i.e., removal of the odor) of the soiled area, the excess liquid can be removed by blotting the site.

The mixed bacterial composition of the present invention is ideal for use with animal litter, such as cat litter, to reduce the odor associated with cat litter boxes, and extend the life of litter between changes. The cheapest litter can be purchased; and can be made from absoprtive materials that are known to be used to produce animal litter, such as clays (i.e., Georgia clays), diatomateous earth, Fuller's earths, and bentonites. Any of these absorptive materials can be the surfaces to which the liquid mixed bacterial compositions of the present invention can be applied. If the compositions of the present invention are applied to cat litter which is used regularly, then the composition should be applied approximately two times per week by spraying the composition directly on the litter. The application of the compositions of the present invention will reduce the odors associated with the cat litter box, and will allow the user to apply the appropriate amount of mixed bacterial composition to meet the individual needs of the user.

The mixed bacterial compositions of the present invention can also be used to produce animal litter, such as cat litter, already containing the mixed bacterial compositions of the present invention. Absorptive materials used to make animal litters, which are well known in the art, including clumping litter, can be sprayed with the mixed bacterial compositions of the present invention to make a damp litter. Then this damp litter is packaged in an airtight, liquid impermeable container for storage until use.

This application is directed to mixed bacterial compositions containing particular strains of bacteria; however, other species or strains of these bacteria could be utilized in the compositions of the present invention as long as the bacteria are capable of performing the desired chemical reactions, such as converting ammonia to nitrite or metabolizing urea. The preferred mixed bacterial composition has been deposited; however, the scope of this application is intended to encompass all strains, variants, or mutants having the identifying characteristics; i.e., capable of performing the desired chemical reactions, of the bacteria contained in the presently deposited mixed bacterial composition designated Green Envy™. The scope of the invention is not intended to be limited to the deposited bacteria, but is intended to encompass less than the eleven bacteria in the deposited mixed bacterial culture, variants and mutants thereof produced by both induced and natural mutation, having the identifying characteristics of the bacteria presently deposited.

Mutation techniques are well known to persons skilled in the art. The mutation techniques can include induced mutagenic methods to include physical treatment, such as irradiation by UV, X-ray or gamma-ray or chemical treatment with nitroso-guanidine or other mutagens. Natural mutation may also occur which is attributable to natural causes. The scope of the present application intends to encompass such mutants as long as the bacteria in the mixed bacterial compositions do not lose their ability to perform the required chemical reactions to metabolize odor and partially metabolize waste materials that generate the odor. The invention is intended to cover alternatives, modifications and equivalents, which may be included within the spirit and scope of the invention as defined by the appended claims.

We claim:

1. A mixed bacterial composition comprising:
   at least one species of Nitrosomonas capable of converting ammonia to nitrite;
   at least one species of Nitrobacter capable of converting nitrite to nitrate;
   at least one species of Pseudomonas capable of converting nitrate to nitrite and capable of metabolizing urea;
   at least one species of Enterobacter capable of metabolizing bacterial waste products; and
   an acclimated mixed bacterial culture comprising:
      at least one species of Pseudomonas capable of converting nitrate to nitrite and metabolizing organic waste;
      at least one species of Acinetobacter capable of metabolizing organic waste; and
      at least one species of Enterobacter capable of metabolizing bacterial waste products.

2. The mixed bacterial composition of claim 1, wherein said acclimated mixed bacterial culture is produced by an acclimation process comprising culturing a mixed bacterial culture containing at least one species of Pseudomonas capable of converting nitrate to nitrite and metabolizing organic waste, at least one species of Acinetobacter capable of metabolizing organic waste, and at least one species of Enterobacter capable of metabolizing bacterial waste products, on minimal inorganic medium under culture conditions sufficient for said mixed bacterial culture to grow logarithmically.

3. The mixed bacterial composition of claim 1, wherein said composition contains two species of Nitrobacter capable of converting nitrite to nitrate.

4. The mixed bacterial composition of claim 1, wherein said acclimated mixed bacterial culture comprises at least three species of Pseudomonas capable of converting nitrate to nitrite and metabolizing organic waste.

5. The mixed bacterial composition of claim 1, wherein said acclimated mixed bacterial culture contains at least four strains of Pseudomonas capable of converting nitrate to nitrite and metabolizing organic waste.

6. The mixed bacterial composition of claim 1, further comprising at least one species of Bacillus capable of metabolizing organic waste.

7. An animal litter for absorbing animal organic waste materials comprising:

an absorptive material; and said mixed bacterial composition of claim 1.

8. A method of metabolizing odor produced by organic waste materials and partially decomposing organic waste materials comprising:

applying a mixed bacterial composition comprising:
- at least one species of Nitrosomonas capable of converting ammonia to nitrite;
- at least one species of Nitrobacter capable of converting nitrite to nitrate;
- at least one species of Pseudomonas capable of converting nitrate to nitrite and capable of metabolizing urea; and
- at least one species of Enterobacter capable of metabolizing bacterial waste products, to organic waste materials present in animal litter; and allowing the bacteria in said mixed bacterial composition to metabolize said organic waste materials.

9. The method of claim 8, wherein said mixed bacterial composition contains at least two species of Nitrobacter capable of converting nitrite to nitrate.

10. The method of claim 8, wherein said mixed bacterial composition, further comprises at least one species of Bacillus capable of metabolizing organic waste.

11. A method of metabolizing odor produced by organic waste materials and partially decomposing organic waste materials comprising:

applying said mixed bacterial composition of claim 1 to organic waste materials; and allowing the bacteria in said mixed bacterial composition to metabolize said organic waste materials.

12. The method of claim 11, wherein said acclimated mixed bacterial culture comprises at least three species of Pseudomonas capable of converting nitrate to nitrite and metabolizing organic waste.

13. The method of claim 11, wherein said acclimated mixed bacterial culture contains at least four strains of Pseudomonas capable of converting nitrate to nitrite and metabolizing organic waste.

14. The method of claim 11, wherein said organic waste material are present in animal litter.

15. The method of claim 11, wherein said organic waste material are present on a surface, wherein said surface is selected from the group consisting of fabric, carpet and flooring.

16. The method of claim 11, wherein said mixed bacterial composition contains at least two species of Nitrobacter capable of converting nitrite to nitrate.

17. The method of claim 11, wherein said mixed bacterial composition, further comprises at least one species of Bacillus capable of metabolizing organic waste.

18. An animal litter for absorbing animal organic waste materials comprising:

an absorptive material; and a mixed bacterial composition comprising:
- at least one species of Nitrosomonas capable of converting ammonia to nitrite;
- at least one species of Nitrobacter capable of converting nitrite to nitrate;
- at least one species of Pseudomonas capable of converting nitrate to nitrite and capable of metabolizing urea; and
- at least one species of Enterobacter capable of metabolizing bacterial waste products.

* * * * *